United States Patent Office 3,849,394
Patented Nov. 19, 1974

3,849,394
MONOAZO PIGMENTS CONTAINING A HYDROXYNAPHTHOYLAMINOACRIDONE RADICAL
Armand Roueche, Neu-Allschwil, Willy Mueller, Riehen, and Rudolf Mory, Dornach, Switzerland, assignors to Ciba Geigy AG, Basel, Switzerland
No Drawing. Original application Dec. 24, 1968, Ser. No. 786,727, now Patent No. 3,627,748. Divided and this application Sept. 28, 1971, Ser. No. 184,589
Claims priority, application Switzerland, Jan. 3, 1968, 7/68; Jan. 12, 1968, 505/68; Nov. 13, 1968, 16,920/68
Int. Cl. C09b 29/22; D06p 1/08, 1/44
U.S. Cl. 260—155    6 Claims

ABSTRACT OF THE DISCLOSURE

Azo pigments are disclosed of the formula

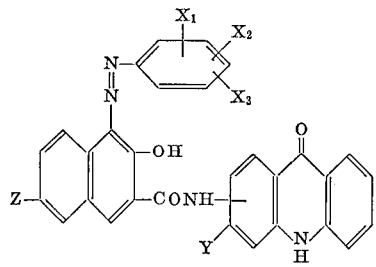

These pigments are useful for coloring plastic masses in orange to red shades of high fastness to light and migration.

---

This is a division of application Ser. No. 786,727, filed Dec. 24, 1968, and now U.S. Pat. 3,627,748.

This invention is based on the observation that valuable new azo pigments of the formula (1)    $\underset{R_1-N=N-R_2-CONHR_3}{OH}$ in which $R_1$ represents an aryl residue, $R_2$ represents a naphthalene residue in which the azo, hydroxyl and carboxylic acid amide groups are in 1,2,3-position and $R_3$ represents a benzoxazolone or benzthiazolone residue bound to the —NH— group in 5- or 6-position or $R_3$ represents an acridone residue, may be obtained (a) by condensing a carboxylic acid halide of the formula (2)    $\underset{R_1-N=N-R_2COhal}{OH}$ with an amine of the formula $R_3NH_2$, or (b) by coupling a diazo compound or diazoamino compound of an amine of the formula $R_1NH_2$ with a coupling component of the formula $\underset{R_2CONHR_3}{OH}$.

Since the products of the invention are pigments, they must not contain groups imparting solubility in water, especially acidic groups imparting solubility in water, for example, sulphonic acid groups or carboxylic acid groups.

Pigments that are of special interest are those corresponding to the formula

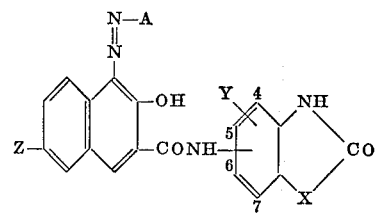

in which A represents a benzene residue, X represents an oxygen or a sulphur atom, Y represents a hydrogen or a halogen atom or an alkyl or alkoxy group and Z represents a hydrogen or a halogen atom or a cyano or alkoxy group and in which the benzoxazolone or benzthiazolone residue is bound to the —NH— group in 5- or 6-position, and especially those of the formula (4)

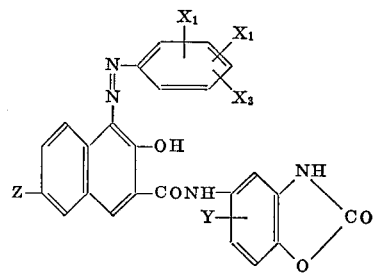

in which $X_1$ and $X_2$ each represents a hydrogen or a halogen atom or an alkyl, alkoxy, phenoxy, nitro, cyano, carboxylic acid ester, alkylsulphone, alkanoylamino or trifluoromethyl group, $X_3$ represents a hydrogen or a halogen atom or a sulphonic acid amide, sulphonic acid monoalkylamide, sulphonic acid dialkylamide, monoarylamide, diarylamide or sulphonic acid ester group or a carboxylic acid amide group that may be substituted, Y represents a hydrogen or a halogen atom or an alkyl or alkoxy group and Z represents a hydrogen or a halogen atom or an alkoxy or cyano group.

Also of interest are pigments of the formula (5)

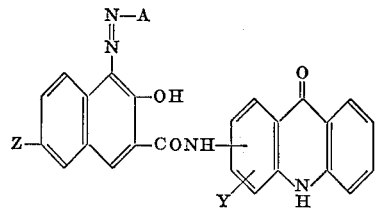

in which Y and Z have the meanings given above and A represents a benzene residue, especially a residue of the formula

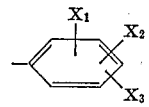

in which $X_1$, $X_2$ and $X_3$ have the meanings given above.

Pigments belonging to the group represented by formula (5) which may be specially mentioned are those of the formula (6)

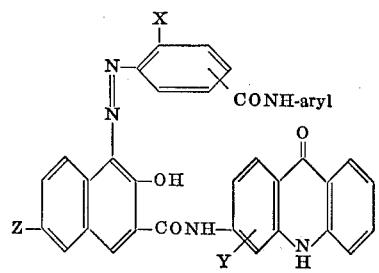

in which X represents a hydrogen or a halogen atom, an alkyl or alkoxy group, a phenoxy group that may be substituted, a carboxylic acid ester group or a nitro group, "aryl" represents a benzene or naphthalene residue that may be substituted or a para-diphenyl or acridone residue that may be substituted and Z and Y have the meanings given above, and in which the carboxylic acid arylide group is in meta- or para-position to the azo group.

The pigments of formula (3) may be obtained by condensing an azo dyestuff carboxylic acid chloride of the formula (7) 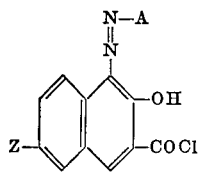

in which A and Z have the meanings given above, with an amine of the formula (8) 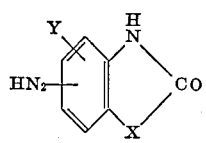

in which X and Y have the meanings given above and in which the amino group is bound to the benzoxazole or benzthiazole residue in 5- or 6-position.

The pigments of formula (5) may be obtained by condensing an azo dyestuff carboxylic acid chloride of formula (7) with a corresponding aminoacridone.

The azo dyestuff carboxylic acids from which the acid chlorides are derived may be obtained by coupling the diazo compounds of an aminobenzene, especially one of the formula (9) 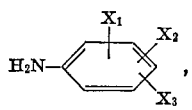

with a 2,3-hydroxynaphthoic acid which carries a hydrogen or a halogen atom or an alkoxy or cyano group in 6-position.

The following aminobenzenes are given as examples of diazo components:

2-, 3- or 4-chloroaniline,
3,4-dichloroaniline,
2,3-dichloroaniline,
2,4-dichloroaniline,
2,5-dichloroaniline,
2,6-dichloroaniline,
2,4,5-trichloroaniline,
2,4,6-trichloroaniline,
2-, 3- or 4-bromoaniline,
2,4-dibromoaniline,
2,5-dibromoaniline,
2-methyl-5-chloroaniline,
2-methyl-4-chloroaniline,
2-methyl-3-chloroaniline,
2-chloro-5-trifluoromethylaniline,
2-, 3- or 4-nitroaniline,
4-chloro-2-nitroaniline,
2-chloro-4-nitroaniline,
2-nitro-4-trifluoromethylaniline,
4-nitro-2-trifluoromethylaniline,
3,5-ditrifluoromethylaniline,
3-trifluoromethylaniline,
4-methyl-3-nitroaniline,
2,4-dimethyl-3-nitroaniline,
2-methyl-5-nitroaniline,
2-methyl-4-nitroaniline,
2- and 4-methoxyaniline,
3-chloro-4-methoxyaniline,
2-methoxy-5-nitroaniline,
2-methoxy-5-chloroaniline,
2-methoxy-5-trifluoromethylaniline,
2-amino-4-trifluoromethyl-4'-chlorodiphenylether,
2-nitro-4-ethoxyaniline,
2-amino-4-chlorodiphenylether,
2-amino-2',4-dichlorodiphenylether,
2-amino-4,4'-dichlorodiphenylether,
1-amino-2-carboxylic acid methylester,
1-amino-2-chloro-5-carboxylic acid methylester,
1-amino-2-chloro-5-carboxylic acid phenylester,
2-amino-5-nitrobenzoic acid methylester,
4-amino-3-nitrobenzotrifluoride,
2-amino-5-nitrobenzotrifluoride,
1-amino-2-methylbenzene-5-carboxylic acid methylester,
1-amino-2-methylbenzene-5-carboxylic acid phenylester,
1-amino-2-chlorobenzene-5-carboxylic acid methylamide,
2-amino-4-trifluoromethyldiphenylether,
4-methyl-3-aminobenzoic acid amide,
4-chloro-3-aminobenzoic acid amide,
2,4-dichloro-5-aminobenzoic acid amide,
4-methoxy-3-aminobenzoic acid amide,
4-methyl-3-aminobenzoic acid-2'-chloro-5'-trifluoromethylanilide,
4-chloro-3-aminobenzoic acid-2',5'-dichloroanilide,
4-chloro-3-aminobenzoic acid-2'-chloro-5'-carbomethoxyanilide,
4-chloro-3-aminobenzoic acid-3'-chloroanilide,
4-chloro-3-aminobenzoic acid-2'-chloro-5'-trifluoromethylanilide,
4-chloro-3-aminobenzoic acid-2'-trifluoromethylanilide,
4-chloro-3-aminobenzoic acid-3',5'-bis-trifluoromethylanilide,
4-chloro-3-aminobenzoic acid-2',4',5'-trichloroanilide,
4-chloro-3-aminobenzoic acid-(2'-acridonyl)amide,
2,4-dichloro-5-aminobenzoic acid-2',5'-dichloroanilide,
2,4-dichloro-5-aminobenzoic acid-2',4'-dichloroanilide,
2,4-dichloro-5-aminobenzoic acid-3'-trifluoromethylanilide,
2,4-dichloro-5-aminobenzoic acid-3'-chloroanilide,
5-amino-4-methoxy-2-chlorobenzoic acid-3'-trifluoromethylanilide,
4-methyl-3-aminobenzoic acid-2',5'-dichloroanilide,
4-methyl-3-aminobenzoic acid-3'-trifluoromethylanilide,
4-methyl-3-aminobenzoic acid-(2'-acridonyl)-amide,
4-methoxy-3-aminobenzoic acid-3'-chloroanilide,
4-methoxy-3-aminobenzoic acid-2',5'-dichloroanilide,
4-methoxy-3-aminobenzoic acid-2',4',5'-trichloroanilide,
4-carbomethoxy-3-aminobenzoic acid anilide,
4-methoxy-3-aminobenzoic acid-3'-trifluoromethylanilide,
4-carboethoxy-3-aminobenzoic acid-2',5'-dichloroanilide,
4-methoxy-3-aminobenzoic acid-3',5'-bis-trifluoromethylanilide,
4-methoxy-3-aminobenzoic acid-2'-chloro-5'-trifluoromethylanilide,
4-methoxy-3-aminobenzoic acid-2',5'-dimethoxy-4'-chloroanilide,
4-methoxy-3-aminobenzoic acid-2',5'-dimethyl-4'-chloroanilide,
4-aminobenzoic acid-2',4'-dichlorophenylamide,
4-aminobenzoic acid-2'-chloro-5'-trifluoromethylphenylamide,
4-amino-3-methylbenzoic acid-3'-trifluoromethylphenylamide,
4-amino-3-methylbenzoic acid-4'-chlorophenylamide,
4-amino-3-nitrobenzoic acid-2',5'-dichlorophenylamide,
4-amino-3-methylbenzoic acid methylester,
4-amino-3-methylbenzoic acid phenylester,
4-methoxy-3-aminobenzoic acid phenylester, and
4-methyl-3-aminobenzoic acid para-chlorophenylester.

The azo dyestuff carboxylic acids thus obtained are treated with agents which are capable of converting carboxylic acids into their acid halides, for example, their acid chlorides or bromides, such substances being, in particular, phosphorus halides, for example, phosphorus pentabromide, phosphorus pentachloride or phosphorus trichloride, phosphorus oxyhalides and preferably thionyl chloride.

The treatment with the said acid halogenating agents is advantageously carried out in an inert organic solvent, for example, dimethylformamide, a chlorobenzene, for example, monochlorobenzene or dichlorobenzene, toluene, xylene or nitrobenzene. If desired, dimethylformamide may be used in conjunction with the last five solvents specified. When preparing the carboxylic acid halides, it is generally advantageous first to dry the azo compounds which are prepared in an aqueous medium, or to free them from water by azeotropic distillation in an organic solvent. If desired, azeotropic drying may be carried out immediately prior to the treatment with the acid halogenating agents.

The azo dyestuff carboxylic acid chlorides so obtained are condensed with amines of formula (8) or with aminoacridones. Examples of such amines are aminobenzthiazolones, for example, 5-aminobenzthiazolone, but especially aminobenzoxazolones, for example, 5-aminobenzoxazolone,
6-aminobenzoxazolone,
5-amino-7-chlorobenzoxazolone,
5-amino-7-bromobenzoxazolone,
5-amino-7-methylbenzoxazolone,
5-amino-7-methoxybenzoxazolone,
6-amino-5-chlorobenzoxazolone, and
6-amino-5-methylbenzoxazolone.

These heterocyclic amines may be obtained by known processes, for example, by condensation of a 1-amino-2-hydroxynitrobenzene with phosgene in an aqueous medium and reduction of the nitrobenzoxazolone so obtained, or, in the case of a 6-aminobenzoxazolone, by phosgenation of a 1-amino-2-phenol, nitration of the benzoxazolone so obtained and reduction of the resulting 6-nitrobenzoxazolone.

The following are given as examples of aminoacridones:
2-aminoacridone,
4-amino-2-methylacridone,
3-amino-6-chloroacridone,
1-amino-4-methylacridone,
2-amino-7-methoxyacridone, or
2-amino-7-ethoxyacridone.

Condensation of the carboxylic acid halides of the kind defined above with the amines is advantageously carried out in an anhydrous medium. Under these conditions it generally proceeds surprisingly easily, even at temperatures within the boiling range of the common organic solvents, for example, toluene, monochlorobenzene, dichlorobenzene, trichlorobenzene, nitrobenzene and the like. To accelerate the reaction, it is generally advantageous to use an agent capable of binding acid, for example, anhydrous sodium acetate or pyridine. Some of the products obtained are crystalline and some are amorphous and they are generally obtained in a very good yield and in a pure state. It is expedient first to isolate the acid chlorides obtained from the carboxylic acids. In some cases, however, isolation of the acid chlorides may be omitted without harm and condensation may be carried out immediately after preparation of the carboxylic acid chlorides.

In process (b) of the invention, the new pigments may be obtained by coupling a diazotised aromatic amine, especially a diazotised aminobenzene, with a coupling component of the formula $R_2CONHR_3$.

The coupling components preferably used are 2,3-hydroxynaphthoic acid arylides of the formula

(10)
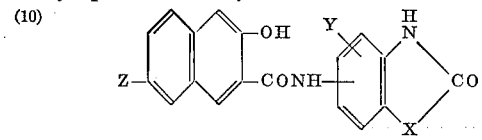

or

(11)
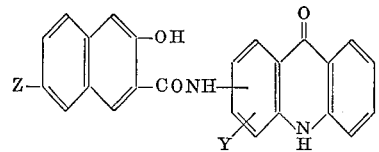

in which X, Y and Z have the meanings given above.

The coupling components mentioned may be obtained by condensing a 2,3-hydroxynaphthoic acid chloride with an amine of formula (8) or an aminoacridone.

Coupling is effected by gradual addition of the aqueous alkaline solution of the coupling component to the acidic solution of the diazonium salt. Coupling is advantageously carried out at a pH value of 4 to 6. The pH value is advantageously adjusted by the addition of a buffer. Suitable buffers are, for example, the salts, especially the alkali metal salts, of formic acid, phosphoric acid or especially acetic acid. The alkali solution of the coupling component advantageously contains a wetting agent, a dispersing agent or an emulsifying agent, for example, an aralkyl sulphonate, for example, dodecylbenzene sulphonate or the sodium salt of 1,1'-naphthylmethane sulphonic acid, polycondensation products of alkylene oxides, for example, the product obtained by reacting ethylene oxide with para-tertiaryoctylphenol, and also the alkylesters of sulphoricinoleates, for example, n-butylsulphoricinoleate. The dispersion of the coupling component may also advantageously contain protective colloids, for example, methylcellulose or small amounts of inert organic solvents which are sparingly soluble or insoluble in water, for example, aromatic hydrocarbons which may be halogenated or nitrated, for example, benzene, toluene, xylene, chlorobenzene, dichlorbenzenes or nitrobenzene, as well as aliphatic halogenated hydrocarbons, for example, carbon tetrachloride or trichloroethylene; also suitable are organic solvents miscible with water, for example, acetone, methyl ethyl ketone, methanol, ethanol or isopropanol.

Coupling may also be carried out advantageously by continuously combining an acidic solution of the diazonium salt with an alkaline solution of the coupling component in a mixing nozzle, during which coupling takes place instantaneously. The pigment dispersion formed is removed continuously from the mixing nozzle and the pigment is isolated by filtration.

The aryldiazoamino compounds to be used in accordance with process (b) of the invention may be obtained by known processes by coupling an aryldiazonium salt with a primary or preferably a secondary amine. A wide variety of amines are suitable for this purpose, for example, aliphatic amines, for example, methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethane sulphonic acid, methylaminoethane sulphonic acid, guanylethane sulphonic acid and β-aminoethyl-sulphuric acid; alicyclic amines, for example, cyclohexylamine, N-methylcyclohexylamine and dicyclohexylamine; aromatic amines, for example, 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid and 1-aminonaphthalene-2,4-disulphonic acid; heterocrylic amines, for example, piperidine, morpholine, pyrrolidine and dihydroindole; sodium cyanamide or dicyanodiamide are also suitable.

Generally, the diazoamino compounds so obtained are sparingly soluble in cold water and, if necessary, may be separated from the reaction medium in a crystalline form after salting out. In many cases, the moist press cake may be used as it is in the further reactions. In some cases, it may be advantageous to dehydrate the diazoamino compounds by vacuum drying prior to the reaction.

Coupling of the diazoamino compound with the naphthol is carried out in an organic solvent, for example, chlorobenzene, ortho-dichlorobenzene, nitrobenzene, pyridine, ethylene glycol, ethylene glycol monoethyl ether or ethylene glycol monomethyl ether, dimethylformamide, formic acid or acetic acid. When using a solvent which is miscible with water, it is not necessary to use the diazoamino compound in an anhydrous form. For example, the water-moist filter cake may be used.

Coupling is advantageously carried out with the application of heat in an acid medium, preferably at a temperature within the range of from 80 to 180° C., and it generally proceeds quickly and is complete. When a neutral solvent is used it is advantageous to add an acid, for example, hydrochloric acid, sulphuric acid, formic acid or acetic acid. By virtue of their insolubility, the pigments obtained may be isolated from the reaction mixture by filtration. Thus, the after-treatment with an organic solvent, to which pigments that have been obtained by coupling in an aqueous medium have to be subjected, is unnecessary in most cases.

The new products are valuable pigments that may be used for a very wide variety of purposes. For example, they may be used in a state of fine division for the spin-coloration of filament and staple-fibre viscose, cellulose ethers, cellulose esters, polyamides, polyurethanes and polyesters, and also in the production of colored lacquers and lake-formers, solutions or products made from cellulose acetate, nitrocellulose, natural or synthetic resins, for example, polymerization resins or condensation resins, for example, aminoplasts, alkyd resins and phenoplasts, and also polyolefines, for example, polyethylene, polypropylene, polystyrene, polyvinyl chloride, and polyacrylonitrile, rubber, casein, silicones and silicone resins. They may also be used advantageously in the manufacture of colored pencils, cosmetic preparations and laminated sheet material.

German Patent Specifications Nos. 1,215,837, 1,216,460 and 1,217,008 refer to azo pigments that differ from those of the present invention in that they contain an imidazolone ring instead of the oxazolone ring. These known pigments are in a very hard form when first obtained from the synthesizing process and are very difficult to convert into a finely divided state. They therefore have to be subjected to further processing before they can be used. However, even when suitably processed they still display disadvantageous rheological behavior. The pigments of the present invention, on the other hand, are obtained in the form of very soft and fine crystals and can be used for all coloration processes in which they are to be added to the formulation prior to final shaping without the need for any special after-treatment. Compared with the pigments described in PB-Bericht 27.858, p. 6351, which contain a 2,3-hydroxynaphthoic acid-β-anthraquinonylamide residue as coupling component, the pigments of the present invention have markedly better fastness to migration.

The following examples illustrate the invention. Unless otherwise stated, the parts and percentages are by weight, and the temperatures are expressed in degrees centigrade.

EXAMPLE 1

36.5 parts of the dyestuff obtained by coupling diazotized 2,5-dichloroaniline with 2,3-hydroxynaphthoic acid, 390 parts of ortho-dichlorobenzene, 16.5 parts of thionyl chloride and 2 parts of dimethylformamide are heated for 2 hours at 135 to 145° C. while stirring, dissolution being complete. After cooling the reaction mixture, the uniformly crystalline azo dyestuff monocarboxylic acid chloride is isolated by filtration, washed successively with 400 parts of benzene and 200 parts of petroleum ether, and then dried in vacuo at 50° C. 29.5 parts of a red crystal powder are obtained.

2.3 parts of the azo dyestuff carboxylic acid chloride so obtained are stirred into 70 parts of dichlorobenzene and the batch is heated to 70 to 80° C. A warm solution of 1.0 part of 5-aminobenzoxazolone in 10 parts of dimethylformamide and 200 parts of ortho-dichlorobenzene is added and the whole is heated for 12 hours at 140 to 145° C. The sparingly soluble pigment which precipitates in the form of fine crystals is isolated by filtration while hot, washed with hot ortho-dichlorobenzene until the filtrate runs clear, then with cold methanol and finally with hot water. After drying in vacuo at 80° C., 2.0 parts of a soft-grained powder are obtained which is virtually insoluble in the common solvents and which colors polyvinyl chloride film and also lacquers a red shade possessing excellent fastness to light, migration and over-stripe bleeding.

The pigment corresponds to the formula

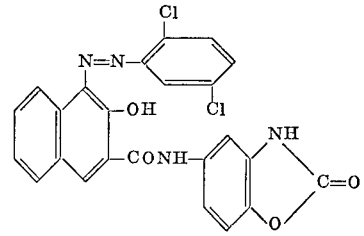

The following table lists components from which further monoazo pigments may be obtained by coupling 1 mol of a diazo compound of an amine listed in column I with 1 mol of a 2,3-hydroxynaphthoic acid as listed in column II in the manner described above in the first paragraph, the monoazo dyestuff carboxylic acid so obtained is converted into the acid chloride and the latter is condensed with 1 mol of an amine as listed in column III. The shades which the pigments produce in polyvinyl chloride film are indicated in column IV.

| | I | II | III | IV |
|---|---|---|---|---|
| 1 | 2,5-dichloroaniline | 2,3-hydroxynaphthoic acid | 5-methyl-6-amino-1,3-benzoxazolone(2) | Brown. |
| 2 | do | do | 5-amino-7-chloro-1,3-benzoxazolone(2) | Red. |
| 3 | do | do | 5-amino-1,3-benzoxazolone(2) | Red. |
| 4 | do | 6-methoxy-2,3-hydroxynaphthoic acid | do | Red. |
| 5 | 2-chloro-5-trifluoromethylaniline | 2,3-hydroxynaphthoic acid | do | Red. |
| 6 | do | do | 5-amino-7-methyl-1,3-benzoxazolone(2) | Red. |
| 7 | do | do | 5-amino-7-chloro-1,3-benzoxazolone(2) | Red. |
| 8 | 2,4,5-trichloroaniline | do | do | Brown. |
| 9 | do | do | 5-amino-7-methyl-1,3-benzoxazolone(2) | Do. |
| 10 | do | do | 5-methyl-6-amino-1,3-benzoxazolone(2) | Do. |
| 11 | do | do | 5-amino-1,3-benzoxazolone(2) | Do. |
| 12 | do | 6-bromo-2,3-hydroxynaphthoic acid | do | Do. |
| 13 | 2-nitro-4-chloroaniline | 2,3-hydroxynaphthoic acid | do | Claret. |
| 14 | 2-methoxy-4-chloroaniline | do | 5-amino-1,3-benzoxazolone(2) | Maroon. |
| 15 | do | do | 6-amino-5-methyl-1,3-benzoxazolone(2) | Claret. |
| 16 | 2-methoxy-5-chloroaniline | do | do | Do. |
| 17 | 2-methoxy-4-nitroaniline | do | 5-amino-7-chloro-1,3-benzoxazolone(2) | Do. |
| 18 | do | 6-bromo-2,3-hydroxynaphthoic acid | 6-amino-5-chloro-1,3-benzoxazolone(2) | Do. |
| 19 | do | do | 5-amino-1,3-benzoxazolone(2) | Brown. |

TABLE—Continued

| | I | II | III | IV |
|---|---|---|---|---|
| 20 | 2-methoxy-5-nitroaniline. | 2,3-hydroxy-naphthoic acid | 6-amino-5-methyl-1,3-benzoxazolone(2). | Red. |
| 21 | Anthranilic acid methylester. | do | 5-amino-7-methyl-1,3-benzoxazolone(2). | Red. |
| 22 | do | do | 5-amino-7-chloro-1,3-benzoxazolone(2). | Red. |
| 23 | do | do | 5-amino-1,3-benzoxazolone(2). | Red. |
| 24 | 2-ethylsulphone-5-trifluoromethylaniline. | do | 6-amino-5-methyl-1,3-benzoxazolone(2). | Orange. |
| 25 | do | do | 6-amino-5-chloro-1,3-benzoxazolone(2). | Do. |
| 26 | do | do | 5-amino-7-chloro-1,3-benzoxazolone(2). | Do. |
| 27 | 2-nitro-4-trifluoromethylaniline. | do | 5-amino-7-methyl-1,3-benzoxazolone(2). | Brown. |
| 28 | do | do | 5-amino-1,3-benzoxazolone-(2). | Red. |
| 29 | 2-trifluoromethyl-4-nitroaniline. | do | do | Red. |
| 30 | do | do | 5-amino-7-methyl-1,3-benzoxazolone(2). | Brown. |
| 31 | do | do | 6-amino-5-chloro-1,3-benzoxazolone(2). | Red. |
| 32 | 2-chloro-5-carbomethoxyaniline. | do | do | Red. |
| 33 | do | do | 5-amino-1,3-benzoxazolone-(2). | Red. |
| 34 | 3-amino-4-methoxybenzoic acid anilide. | do | 6-amino-5-methyl-1,3-benzoxazolone(2). | Bluish-red. |
| 35 | do | do | 6-amino-5-chloro-1,3-benzoxazolone(2). | Do. |
| 36 | 3-amino-4-methoxybenzoic acid-3'-trifluoromethylanilide. | do | 5-amino-1,3-benzoxazolone(2). | Do. |
| 37 | do | do | 5-amino-7-chloro-1,3-benzoxazolone(2). | Do. |
| 38 | 3-amino-4-chlorobenzoic acid-2'-chloro-5'-trifluoromethylanilide. | do | do | Red. |
| 39 | 3-amino-4-chlorobenzoic acid-3'-trifluoromethylanilide. | do | 5-amino-1,3-benzoxazolone-(2). | Red. |
| 40 | do | do | 5-amino-7-chloro-1,3-benzoxazolone(2). | Red. |
| 41 | 3-aminobenzoic acid-3'trifluoromethylanilide. | do | 5-amino-1,3-benzoxazolone-(2). | Red. |
| 42 | 3-amino-4-methylbenzoic acid-3'-trifluoromethylanilide. | do | do | Bluish-red. |
| 43 | 3-amino-4-chlorobenzoic acid-anilide. | do | 6-amino-5-chloro-1,3-benzoxazolone(2). | Orange. |
| 44 | 3-amino-4-chlorobenzoic acid-2'-methyl-3'-chloroanilide. | do | 5-amino-1,3-benzoxazolone(2). | Red. |
| 45 | 3-amino-4-chlorobenzoic acid-2'-carbomethoxyanilide. | do | do | Red. |
| 46 | 3-amino-4-methoxybenzoic acid-4'-chlorophenylester. | do | do | Bluish-red. |
| 47 | 3-amino-4-chlorobenzoic acid-4'-chlorophenylester. | do | do | Red. |
| 48 | 3-amino-4-methoxysulphonic acid-phenyl ester. | do | do | Red. |
| 49 | 2,5-dichloroaniline. | do | 5-amino-1,3-benzthiazolone(2). | Red. |
| 50 | do | 6-bromo-2,3-hydroxy-naphthoic acid. | 5-amino-1,3-benzoxazolone(2). | Bluish-red. |
| 51 | do | 6-methoxy-2,3-hydroxy-naphthoic acid. | do | Do. |

EXAMPLE 2

2.1 parts of 4-amino-3-nitrobenzoic acid ethylester are diazotized in the usual manner with glacial acetic acid, aqueous hydrochloric acid, ice and sodium nitrite.

Separately from this, 3.2 parts of 5-(2'-hydroxy-3'-naphthoylamino)-benzoxazolone are dissolved cold in a mixture of 150 parts of ethanol, 50 parts of water and 4 parts of 30% sodium hydroxide solution. 1 part of the condensation product derived from 8 mols of ethylene oxide and 1 mol of para-tert.-octylphenol is added to the solution and the pH of the naphthol solution is adjusted to 7 to 7.5 with 30% acetic acid while stirring well. The diazo solution described above is added and the pH is kept at between 7 and 7.5 by the addition of a sodium carbonate solution and the temperature is maintained at between 20 and 30° C. The batch is stirred for 1 hour at the same temperature to complete the coupling, the pigment suspension which forms is rendered acid to Congo paper by the addition of hydrochloric acid and the pigment is then isolated by filtration. It is washed with hot water until chlorine ions are no longer detectable in the filtrate. The product is dried in vacuo at 80 to 90° C. and 3.5 parts of the red pigment of the formula

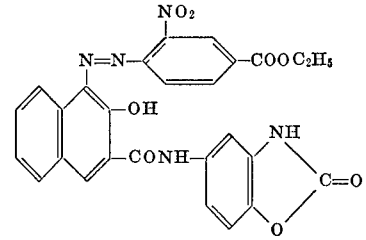

are obtained.

The properties of the pigment may be improved by an after-treatment in an organic solvent, for example, nitrobenzene. It is sparingly soluble to insoluble in the common solvents and colors polyvinyl chloride film and also lacquers an orange shade possessing good fastness to migration, overstripe bleeding and light.

The following table lists components from which further monoazo pigments may be obtained by coupling 1 mol of a diazo compound of an amine as listed in column I with 1 mol of a coupling component of a 2,3-hydroxynaphthoic acid arylide as listed in column II in accordance with the second process which is described herein. The shade which the pigments produce in polyvinyl chloride film are indicated in column III.

| | I | II | III |
|---|---|---|---|
| 52 | 2-ethylsulphone-5-trifluoromethylaniline. | 5-(2'-hydroxy-3'-naphthoylamino)-1,3-benzoxazolone (2). | Orange. |
| 53 | 5-aminoisophthalic acid-diamide. | do | Red. |
| 54 | 5-aminoisophthalic acid-dimethylester. | do | Orange. |
| 55 | 3-amino-4-methylbenzoic acid-methylamide. | 5-(2'-hydroxy-3'-naphthoylamino)-7-chloro-1.3-benzoxazolone (2). | Red. |
| 56 | do | 5-(2'-hydroxy-3'-naphthoylamino)-1,3-benzoxazolone (2). | Bluish Red. |
| 57 | 3-amino-4-methylbenzoic acid-amide. | 5-chloro-6-(2'-hydroxy-3'-naphthoylamino)-1,3-benzoxazolone (2). | Red. |
| 58 | 3-amino-4-methylbenzoic acid-methylester. | do | Red. |
| 59 | 3-amino-4-chlorobenzoic acid-amide. | 5-(2'-hydroxy-3'-naphthoylamino)-1,3-benzoxazolone (2). | Brown. |
| 60 | 3-amino-4-chlorobenzoic acid-methylamide. | do | Red. |
| 61 | do | 5-chloro-6-(2'-hydroxy-3'-naphthoylamino)-1,3-benzoxazolone (2). | Red. |
| 62 | 4-amino-5-methoxy-2-methylbenzenesulphonic acid methylamide. | do | Red. |
| 63 | do | 5-(2'-hydroxy-3'-naphthoyl-amino)-1,3-benzoxazolone -2). | Red. |
| 64 | 4-amino-2,5-dimethoxy-benzenesulphonic acid methylamide. | do | Bluish grey. |

TABLE—Continued

| I | II | III |
|---|---|---|
| 65 ........do.................... | 5-chloro-(2'-hydroxy-3'-naphthoylamino)-1,3-benzoxazolone (2). | Grey. |
| 66.... 2,5-dimethoxy-4-benzyl sulphone-aniline. | .....do.................... | Bluish red. |

EXAMPLE 3

1 part of the diazoamino compound of the formula

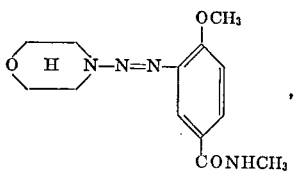

prepared by coupling diazotized 3-amino-4-methoxybenzoic acid methylamide with morpholine in an alkaline medium, and 1.05 parts of 6-(2'-hydroxy - 3' - naphthoylamino) - 5 - chlorobenzoxazolone are suspended in 130 parts of ortho-dichlorobenzene, the suspension is heated to 120 to 125° C. and then 6 parts of glacial acetic acid are added. The batch is stirred for 1 hour at 145 to 150° C., during which cleavage of the diazoamino compound and coupling to form the pigment are finished. The red pigment is isolated by filtration while hot, washed successively with hot ortho-dichlorobenzene, cold methanol and hot water and then dried *in vacuo* at 80° C. 1.35 parts of a red monoazo pigment of the formula

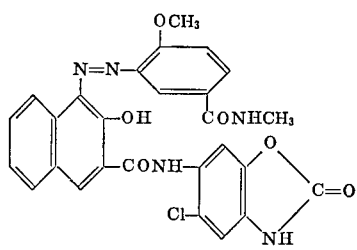

are obtained. The yield is good and the pigment is soft.

It is sparingly soluble to insoluble in the common solvents and colors polyvinyl chloride film a red shade possessing good fastness to light, overstripe bleeding and migration.

EXAMPLE 4

16.5 parts of the dyestuff obtained by coupling diazotized 1-(3'-amino-4' - chlorobenzoylamino)-2,4,5-trichlorobenzene with 2,3-hydroxynaphthoic acid are heated for 12 hours at 55 to 60° C. in 200 parts by volume of chlorobenzene together with 2.4 parts by volume of dimethylformamide and 4.3 parts by volume of thionyl chloride. The dyestuff acid chloride which is obtained thereby in the form of needles is isolated by filtration when cool, washed with a small amount of benzene and dried *in vacuo* at 60 to 70° C. 15.85 parts of the acid chloride are obtained (93% of the theoretical yield).

3.92 parts of this acid chloride and 1.55 parts of 2-aminoacridone are heated for 12 hours at 130 to 140° C. in 150 parts by volume of ortho-dichlorobenzene. The pigment which forms is then isolated by filtration while hot, washed successively with hot ortho-dichlorobenzene, dimethylformamide, methanol and water and then dried *in vacuo* at 60 to 70° C. 4.1 parts (80% of the theoretical yield) of a brown powder are obtained. The pigment corresponds to the formula

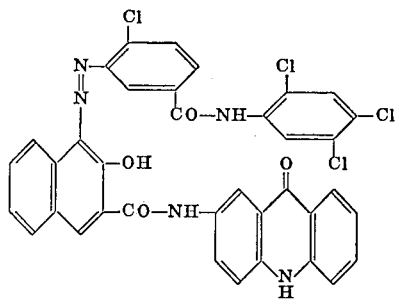

It colors polyvinyl chloride a yellowish brown shade of very high fastness to light and migration.

Further monoazo pigments may be obtained by coupling a diazo compound of an amine as listed in column I of the following table with 2,3-hydroxynaphthoic acid according to the process described in the preceding paragraphs, converting the monoazo dyestuff carboxylic acid so obtained into the acid chloride and condensing the latter with 2-aminoacridone. The shades which the pigments produce in polyvinyl chloride film are indicated in column II.

| I | II |
|---|---|
| 1..... 1-(3'-amino-4'-chlorobenzoylamino)-2-methylbenzene. | Scarlet. |
| 2..... 1-(3'-amino-4'-chlorobenzoylamino)-2-chlorobenzene. | Yellowish brown. |
| 3..... 1-(3'-amino-4'-chlorobenzoylamino)-2,5-dichlorobenzene. | Do. |
| 4..... 1-(3'-amino-4'-chlorobenzoylamino)-2-methoxybenzene. | Do. |
| 5..... 1-(3'-amino-4'-methylbenzoylamino)-2,5-dichlorobenzene. | Red. |
| 6..... 1-amino-2-methoxy-4-nitrobenzene. | Greyish violet. |
| 7..... 1-amino-2,5-dichlorobenzene. | Brown. |
| 8..... 1-(3'-amino-4'-methylbenzoylamino)-2,4-dichlorobenzene. | Scarlet. |
| 9..... 1-(3'-amino-4'-methylbenzoylamino)-2-trifluoromethyl-4-chlorobenzene. | Reddish brown. |
| 10.... 1-(3'-amino-4'-methylbenzoylamino)-2-chlorobenzene. | Scarlet. |
| 11.... 1-(3'-amino-4'-methylbenzoylamino)-2-methylbenzene. | Brownish red. |
| 12.... 1-(3'-amino-4'-methylbenzoylamino)-2-methoxybenzene. | Red. |
| 13.... 1-(3'-amino-4'-chlorobenzoylamino)-2-chloro-5-trifluoromethylbenzene. | Brownish orange. |
| 14.... 1-(3'-amino-4'-methylbenzoylamino)-2-chloro-5-trifluoromethylbenzene. | Scarlet. |
| 15.... 1-(3'-amino-4'-chlorobenzoylamino)-2,4-dichlorobenzene. | Yellowish brown. |
| 16.... 1-(3'-amino-4'-chlorobenzoylamino)-2-trifluoromethyl-4-chlorobenzene. | Do. |
| 17.... 4-chloro-3-aminobenzoic acid phenylamide. | Scarlet. |
| 18.... 4-methyl-3-aminobenzoic acid phenylamide. | Do. |
| 19.... 1-(3'-amino-4'-methoxybenzoylamino)-2-methylbenzene. | Bluish red. |
| 20.... 1-amino-2-chloro-5-trifluoromethylbenzene. | Yellowish brown. |
| 21.... 1-(3'-amino-4'-chlorobenzoylamino)-3-trifluoromethylbenzene. | Scarlet. |
| 22.... 1-(3'-aminobenzoylamino)-2-chloro-5-trifluoromethylbenzene. | Brownish orange. |
| 23.... 3-chloro-4-aminophenylmethylsulphone. | Khaki. |
| 24.... 1-(3'-amino-4'-methoxybenzoylamino)-2-chloro-5-trifluoromethylbenzene. | Bluish red. |
| 25.... 1-(3'-amino-4'-methoxybenzoylamino)-3-trifluoromethylbenzene. | Do. |
| 26.... 3-amino-4-methoxybenzoic acid phenylamide. | Do. |
| 27.... 3-amino-4-chlorobenzoic acid-(2'-acridonylamide). | Yellowish brown. |

EXAMPLE 5

2.95 parts of 3-amino-4-chlorobenzoic acid-(2'-methyl-5'-chloro)-anilide are dissolved in 10 parts by volume of glacial acetic acid with 3 parts by volume of concentrated hydrochloric acid and diazotized with 5 parts by volume of 2N sodium nitrite while cooling. The diazo solution is then run within 15 minutes into a solution of 3.35 parts of 2-(2',3'-hydroxynaphthoylamino)-acridone and 2 parts of anhydrous sodium acetate in 150 parts by volume of dimethylformamide. The mixture is stirred for 3 hours at room temperature, the pigment which forms is isolated, washed thoroughly with water and methanol and then dried. 5.8 parts of pigment are obtained. When converted into a state of fine division, it colors polyvinyl chloride a dull red shade which is fast to migration. The pigment has the formula

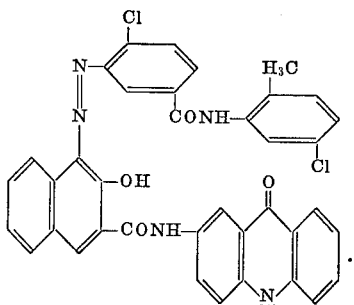

EXAMPLE 6

A mixture is prepared from 65 parts of stabilized polyvinyl chloride, 35 parts of dioctyl phthalate and 0.2 part of the pigment obtained in accordance with paragraphs 1 to 3 of Example 1 and then worked to and fro for 7 minutes at 140° C. on a two-roller mill. A pure red film possessing very good fastness to light and migration is obtained.

What is claimed is:

1. An azo pigment of the formula

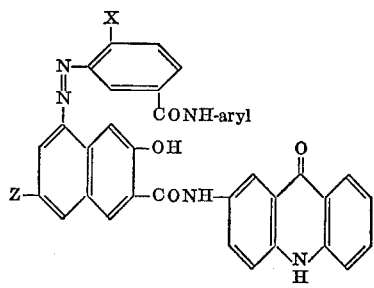

wherein X is hydrogen, chlorine, methyl, or methoxy; aryl is phenyl, or phenyl substituted by chlorine, lower alkyl, lower alkoxy or trifluoromethyl; and Z is hydrogen, halogen, lower alkoxy or cyano.

2. The dyestuff of the formula

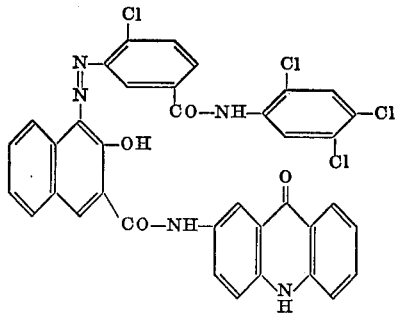

3. The dyestuff of the formula

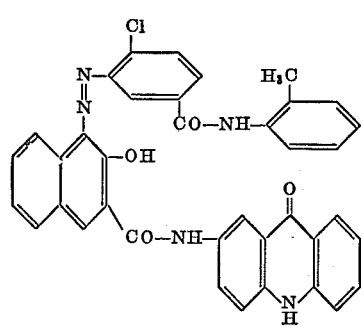

4. The dyestuff of the formula

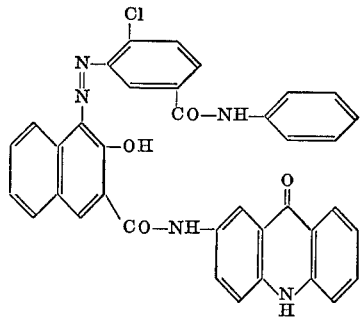

5. The dyestuff of the formula

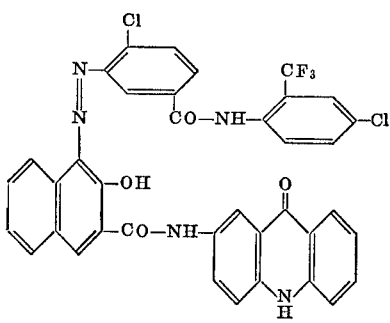

6. The dyestuff of the formula

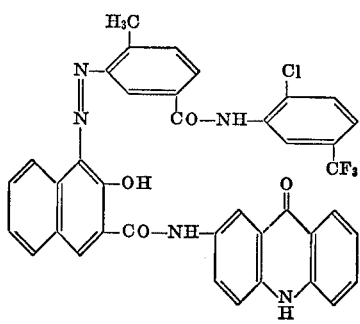

References Cited

UNITED STATES PATENTS

| | | | |
|---|---|---|---|
| 2,725,375 | 11/1955 | Brody | 260—152 |
| 2,908,678 | 10/1959 | Goebel et al. | 260—154 |
| 3,113,938 | 12/1963 | Nakaten et al. | 260—204 |
| 3,124,565 | 3/1964 | Schilling et al. | 260—157 |
| 3,200,109 | 8/1965 | Ribka | 260—203 |
| 3,609,134 | 9/1971 | Mory. | |
| 1,915,461 | 6/1933 | Zitscher | 260—155 |

FOREIGN PATENTS 473,615  10/1937  Great Britain _____ 260—155

OTHER REFERENCES

BP Report, 27,858, p. 6351 (1929).

FLOYD D. HIGEL, Primary Examiner

U.S. Cl. X.R.

106—19, 288 Q; 117—121, 123 C, 139, 143 R, 144, 138.8 B, 138.8 E, 138.8 UA; 260—37 R, 41 C, 157, 203, 204 279 R, 307 D; 424—23